RADIATION-SENSITIVE CAMERA SHUTTER AND APERTURE CONTROL SYSTEMS

Original Filed May 28, 1970 3 Sheets-Sheet 1

RADIATION-SENSITIVE CAMERA SHUTTER AND APERTURE CONTROL SYSTEMS

Original Filed May 28, 1970 3 Sheets-Sheet 2

RADIATION-SENSITIVE CAMERA SHUTTER AND APERTURE CONTROL SYSTEMS

Original Filed May 28, 1970 3 Sheets-Sheet 3

United States Patent Office

Re. 27,867
Reissued Jan. 1, 1974

27,867

RADIATION-SENSITIVE CAMERA SHUTTER AND APERTURE CONTROL SYSTEMS

Kenneth E. Years, Plano, Tex., assignor to Texas Instruments Incorporated, Dallas, Tex.

Original No. 3,626,825, dated Dec. 14, 1971, Ser. No. 41,402, May 28, 1970. Application for reissue May 5, 1972, Ser. No. 250,799
Int. Cl. G01j *1/00*
U.S. Cl. 95—10 C 8 Claims

Matter enclosed in heavy brackets [ ] appears in the original patent but forms no part of this reissue specification; matter printed in italics indicates the additions made by reissue.

ABSTRACT OF THE DISCLOSURE

A voltage that varies linearly with light intensity variation is generated by an amplifier having a differential input stage connected to a light responsive diode. Two high gain transistors are included in the differential input stage to provide amplification of the signal currents of the light responsive diode. In a camera shutter and aperture control system, the linearly varying light intensity voltage is amplified to control two threshold detector circuits. An inhibiting circuit prevents one of the threshold detector circuits from responding to the light intensity voltage until the first threshold circuit has completed its desired operation.

This invention relates to photosensor control and more particularly to photosensor control circuitry that produces a voltage varying linearly with light intensity.

By far the greatest use of light responsive detectors is in circuitry that produces an on-off signal. When the ambient light in which a photosensor is located reaches a critical level, the detector circuit switches from one steady-state condition to a second steady-state condition. Such circuits usually employ the photosensor in a voltage sensing arrangement. A few circuits are designed to produce an output voltage that varies with light intensity; these circuits also employ the photosensors as a voltage device. Voltage responsive circuits have found limited use with photosensors because most detectors produce a voltage variation that is too small for the conventional amplifier circuit.

An object of the present invention is to provide an amplifier for generating a voltage that varies linearly with light intensity. Another object of this invention is to provide an amplifier including a differential input stage for producing a voltage that varies linearly with light intensity. A further object of this invention is to provide an amplifier including a photosensor in a current responsive configuration. Still another object of this invention is to provide an amplifier having a high gain differential input stage connected to a photosensor. A still further object of this invention is to provide an autofilter photosensor in an amplifier for producing a voltage that varies linearly with light intensity. Yet another object of this invention is to provide a photosensor in a circuit that produces a voltage that varies linearly with light intensity for camera shutter and aperture control.

In accordance with this invention, an amplifier for generating a voltage that varies in accordance with light intensity includes a light responsive diode that produces a current signal that changes with the light intensity incident thereon connected to a different input section. A feedback loop connected from the output of the amplifier and to one side of the light responsive diode establishes the closed loop amplifier gain and relates the output of the amplifier to the signal generated by the diode. In one configuration of a feedback loop, the amplifier output varies linearly with the light intensity incident on the light responsive diode.

In accordance with a more specific embodiment of this invention, a light responsive diode that generates a current signal that varies with light intensity incident thereon connects to the inputs of a differential amplifier. The differential amplifier includes a first input transistor with a current gain factor in the range of from 1000 to 5000 connected in a differential configuration with a second input transistor also having a current gain factor in the range of from 1000 to 5000. A feedback loop connected from the output of the amplifier to one side of the light responsive diode determines the closed loop amplifier gain and relates the output of the amplifier to the signal generated by the light responsive diode. A biasing source connected to the second input of the differential configuration and to one side of the light responsive diode establishes a reference level for amplifier operation.

A more complete understanding of the invention and its advantages will be apparent from the specification and claims and from the accompanying drawings illustrative of the invention.

Referring to the drawings.

Figure 1:
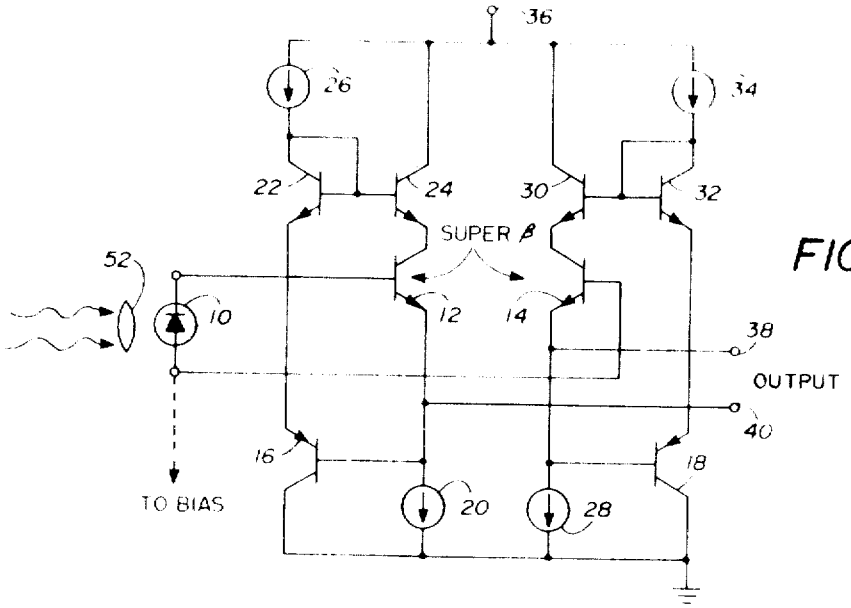
FIG. 1 is a schematic of a bipolar differential amplifier having an output that varies proportionately with the light intensity as measured by a photosensor.

Referring to FIG. 1, a photosensor 10 in a diode configuration has a cathode electrode connected to the base electrode of a first input transistor 12 and an anode electrode connected to the base electrode of a second input transistor 14. A bipolar circuit of the type shown exhibits high voltage gain per stage and accurate light level sensing incident on the photosensor 10. To accommodate the low current levels of the photosensor 10, the transistors 12 and 14 have a "super-beta" characteristic. A super-beta transistor is defined as one with electrical characteristics of: $\beta=1000$ to 5000 and $BV_{CEO}$ of approximately 2 to 5 volts. The base widths of super-beta transistors are nominally approximately 0.01 mil. Because of the high beta values, the effective input impedance of the bipolar transistor amplifier of FIG. 1 is a factor of 10 above an amplifier using conventional beta transistors at the input stage.

To maintain the 2 to 5 volt $BV_{CEO}$ value for the transistors 12 and 14, the circuit of FIG. 1 include transistors 16 and 18. Transistor 16 has a base electrode connected to the emitter of the transistor 12 and a current source 20. Additional circuitry for maintaining the current and voltage level for the transistor 12 includes a pair of back-to-back transistors 22 and 24 along with a current source 26. Transistor 18 has a base electrode connected to the emitter of the transistor 14 and a current source 28. Additional circuitry for maintaining the current and voltage level of the transistor 14 includes a transistor 30 connected in a back-to-back arrangement with a transistor 32 and a current source 34. Not included in the schematic of FIG. 1 are various resistors for establishing biasing and current levels. The circuit of FIG. 1 is energized from a D.C. voltage source connected to the terminal 36.

A differential output from the transistors 12 and 14 appears at the output terminals 38 and 40 and is proportional to the light intensity incident on the photosensor 10.

With the diode 10 connected as shown, it operates in a current mode; that is, the transistors 12 and 14 respond to current levels generated in the diode. In the current mode of operation, a higher frequency response is achievable from the diode 10 as compared to a voltage mode of operation. This advantage of current mode operation is due to the capacitance associated with the photodiode. In a voltage mode of operation, this capacitance must be charged and discharged. Diode capacitance has little if any affect in the current mode.

In one form, the photosensor 10 is a selenium photovoltaic diode constructed by depositing a layer of selenium on a conductive substrate followed by a layer of cadmium oxide. The N-type CdO forms a junction with the p-type selenium. Photons penetrate the opaque CdO layer and create hole-electron pairs in the selenium. The electrons slide down the p-junction potential barrier into the CdO and a current proportional to the light created hole-electron pairs will flow and be amplified by the transistors 12 and 14.

In applications where light memory (the retention of the hole-electron pairs in the selenium) is of concern, an all silicon photosensor is preferred to the thin film selenium junction photosensors. Silicon photosensors exhibit improved signal-to-noise ratio over the selenium counterpart and silicon is memory free for response times greater than a few milliseconds.

Figure 2:
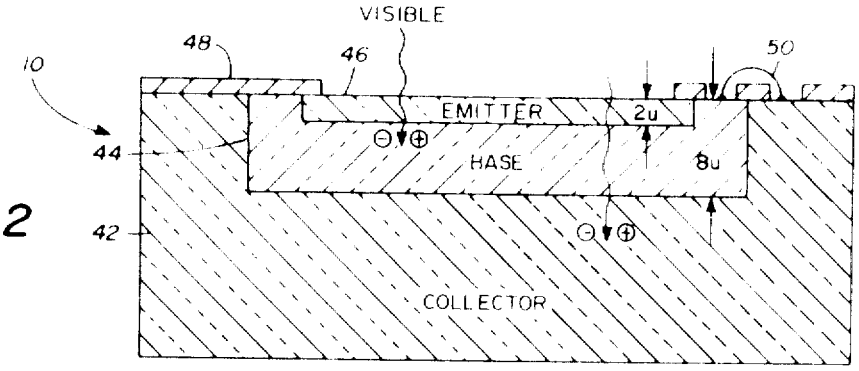
FIG. 2 is a cross section of a near infrared auto-filter p-n junction photosensor.

Referring to FIG. 2, there is shown in cross section a silicon photosensor 10 having a silicon substrate 42 as the collector electrode with a base region 44 and an emitter region 46 that are diffused into the substrate by subsequent diffusion processes through a silicon dioxide layer 48. Silicon p-n junctions will respond readily to both the visible (0.4 to 0.7 micron) and the near infrared (0.7 to 1.1 microns) wavelengths because of the nature of the silicon photo absorption coefficient.

To render the silicon photosensor insensitive to the near infrared for applications where only visible light is of interest, selective photo response is achieved by arranging the transistor diffusion schedule such that the deeply penetrating near infrared radiation produces ionization in the transistor collector body where the resulting photocurrent is inoculously removed by short circuiting the collector-base junction. This shorting is accomplished by the jumper wire 50. For the near infrared radiation photons to travel through the emitter and base diffusions into the collector region, the depth of the base region is on the order of 8 microns. Using a 2 micron diffusion for the emitter 46, and the 8 micron diffusion for the base region 44, photons in the visible region will penetrate through the emitter region into the base region where they produce photocurrents related to the photo bombardment.

The photosensor 10 of FIG. 2 will be connected into the amplifier of FIG. 1 such that its emitter-base junction is zero or slightly reverse biased. With the photosensor so connected and with the collector-base junction physically short circuited by the jumper wire 50, little if any transistor action will take place.

By operating the silicon photosensor with the emitter-base junction in a zero or a slightly reverse biased configuration, the dark current leakage characteristic of a p-n junction, which is temperature dependent, may be eliminated. The leakage current for a p-n junction at voltages less than a few tenths volts positive is given by:

$$I_{Dark}=I_s\left(e^{\frac{qV}{nkt}}-1\right)+I_{Surf.}+I_{Gen.\ (dep.\ layer)} \quad (1)$$

Each of the currents in Equation 1 *is* [are] strongly temperature dependent and will introduce an error in the photo generated current of the diode since the total current flow with the diode exposed to illumination (assuming the depletion layer width is zero) will be:

$$I_{Tot.}=I_{Dark}-qR(L_n+L_p) \quad (2)$$

where

R=carrier generation rate per unit volume of incident illumination, and $L_n$, $L_p$=diffusion length of minority carrier electrons and holes, respectively.

Figure 4:
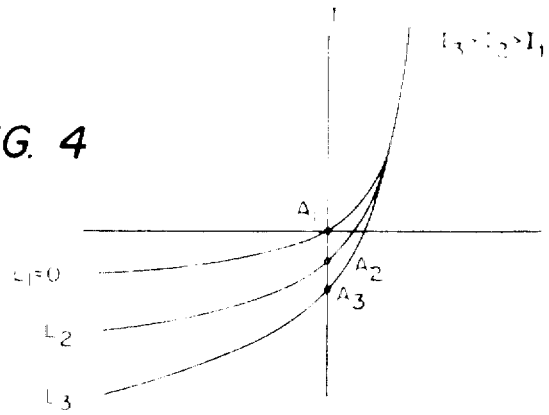
FIG. 4 is a plot of photocurrent as a function of voltage for a p-n junction photosensor.

With the emitter-base junction operated at a zero or slightly negative bias, Equation 2 reduces to:

$$I_{Tot.}=qR(L_n+L_p) \quad (3)$$

whereby temperature dependent leakage current components have been eliminated. The zero or slightly negative bias mode of operation is graphically illustrated by the curves of FIG. 4 by points $A_1$, $A_2$ and $A_3$ which represent illumination intensity $L_1$, $L_2$ and $L_3$, respectively.

To limit the response of a silicon photosensor [below] *to* the visible region, an optical filter 52 is placed in the path of the radiation incident on the sensor, as illustrated in FIG. 1.

Figure 3:
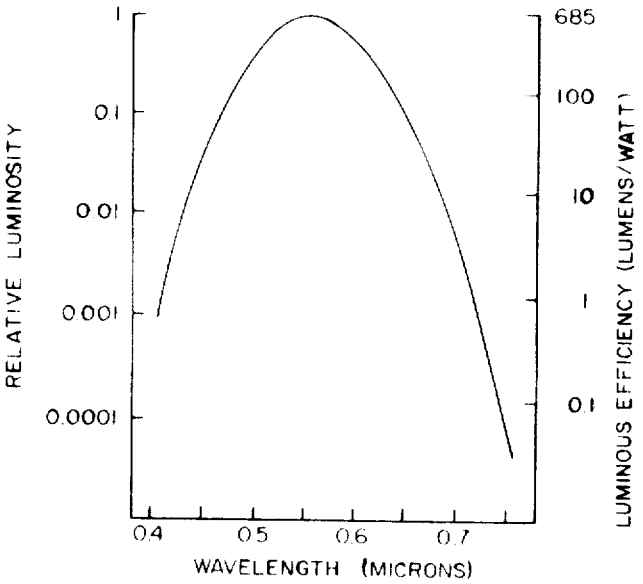
FIG. 3 is a curve of relative luminosity as a function of wavelength in microns.

Referring to FIG. 3, there is shown a luminosity curve, that is, the sensitivity of the human eye to radiant energy as a function of radiation wavelengths. By employing a selective diffusion schedule as explained and the optical filter 52, the response of a silicon photosensor may be limited to the visible region between 0.4 and 0.7 micron.

Figure 5:
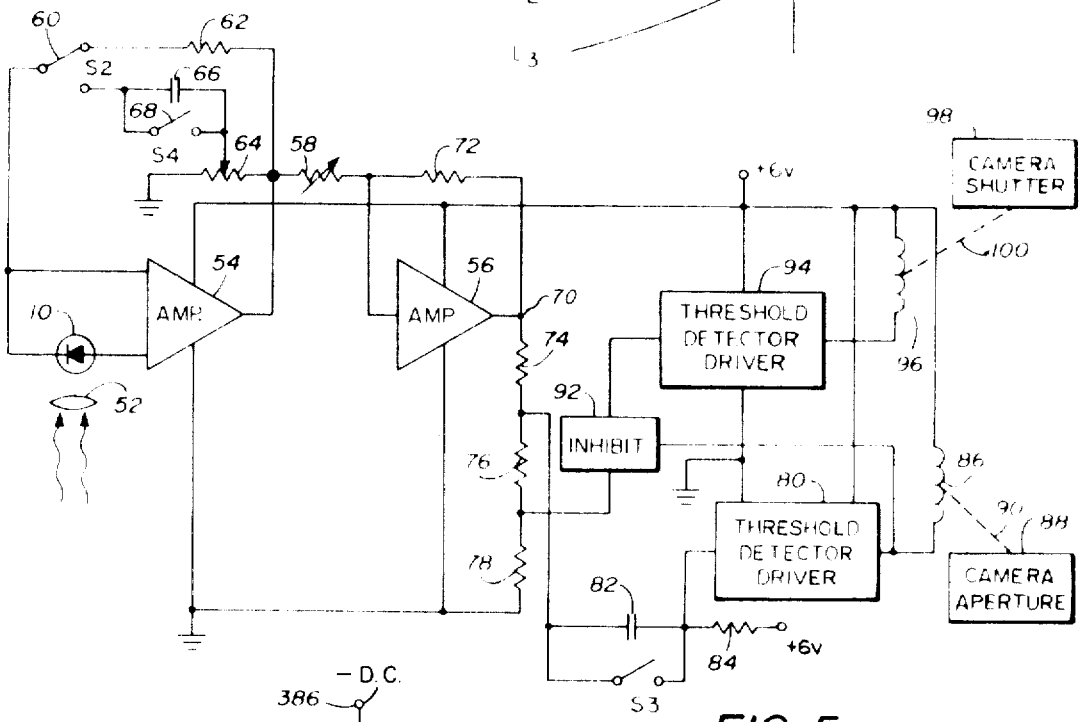
FIG. 5 is a schematic and block diagram of a camera aperture and shutter control system employing the differential amplifier of FIG. 1.

One application of the circuit of FIG. 1, using either a selenium photovoltaic diode or a silicon photosensor, is in a camera shutter and aperture control as illustrated in FIG. 5. The photosensor 10 generates a current flow in the input stage of an operational amplifier 54 in accordance with light intensity passing through the optical filter 52. The differential amplifier of FIG. 1 comprises the input stage of the operational amplifier 54. A voltage output from the amplifier 54 is proportional to the light intensity on the photosensor 10 and is applied to the input of an operational amplifier 56 through an adjustable resistor 58.

A feedback circuit connected from the output of the amplifier 54 and to the cathode electrode of the photosensor 10 tailors the input of the amplifier 56 to have a desired relationship to the light intensity. This feedback circuit includes two paths selectable by means of a switch 60. In the position shown, switch 60 connects a resistor 62 in the feedback circuit and the output of the amplifier 54 varies proportionally with the light intensity incident on the photosensor 10. With the switch 60 in the second position, the feedback circuit includes a variable resistor 64 and a capacitor 66. This circuit relates the output of the amplifier 54 to the time integral of the current generated by the photosensor 10. A switch 68 is closed to shunt the capacitor 66 at the completion of one operating cycle of the control system of FIG. 5.

A signal applied to the input of the operational amplifier 56 is amplified therein to an output voltage level appearing at a terminal 70. A voltage at the terminal 70 is fed back to the input of the amplifier 56 through a feedback resistor 72 and divided in a voltage divider network of resistors 74, 76 and 78 into two threshold detector input signals. A voltage at the junction of resistors 74 and 76 is applied to an input of a threshold detector driver 80 through a timing circuit consisting of a capacitor of a capacitor 82 and a resistor 84. An output of the driver 80 connects to a solenoid 86 for controlling the opening of a camera aperture 88 through a mechanical linkage 90. An output of the driver 80 is also applied to an inhibit circuit 92 that interrupts the circuit between the junction of resistors 76 and 78 and the input terminal of a threshold detector driver 94.

Initially, the aperture 88 begins to open and at the same time the switch S–3 is opened. This operation continues until a charge on the capacitor 82 reaches a threshold level. At the threshold level, the output voltage at the output of the driver 80 drops to zero, thereby de-energizing the solenoid 86. This clamps the *aperture* [aperature] 88 at a desired setting. Since the output of the amplifier 56 at terminal 70 is related to the output of the amlifier 54, which in turn is related to the light intensity incident on the photosensor 10, the opening the aperture 88 will be determined by the level of light intensity passing through the optical filter 52.

Upon completion of the operation of the driver 80, the inhibit circuit 92 completes the circuit between the junction of resistors 76 and 78 and the input of the threshold detector driver 94. A voltage appearing at the junction of the resistors 76 and 78 is applied to the driver 94 to actuate a solenoid 96 for controlling the operation of a camera shutter 98 through a mechanical linkage 100. Also, upon completion of the operation of the driver 80, the switch 60 is changed to a position to connect the capacitor 66 in the feedback circuit of the operational amplifier 54. The output of the amplifier 54, and consequently the output of the amplifier 56 at terminal 70, now varies as the time integral of the light intensity incident upon the photosensor 10. This signal changes in a manner determined by the resistor 64 and the capacitor 66. When it reaches a threshold level as determined by circuitry of the detector driver 94, the output of the driver de-energizes the solenoid 96 to return the shutter 98 to a closed position. Thus, the time that the shutter 98 remains open is deermined by the light intensity incident on the photosensor 10. Note, that by means of the inhibit circuit 92, operation of the shutter 98 is prevented until after the aperture 88 has been opened to the desired level.

Many threshold detectors may be used in the system illustrated and may consist of a high gain differential input and a single ended output amplifier. The function of the detector drivers is to compare a signal voltage on one input with a fixed internal reference. When the input exceeds the reference voltage, the output amplifier is switched to a non-conducting state thereby changing the energization state of the respective solenoid.

Figure 6:
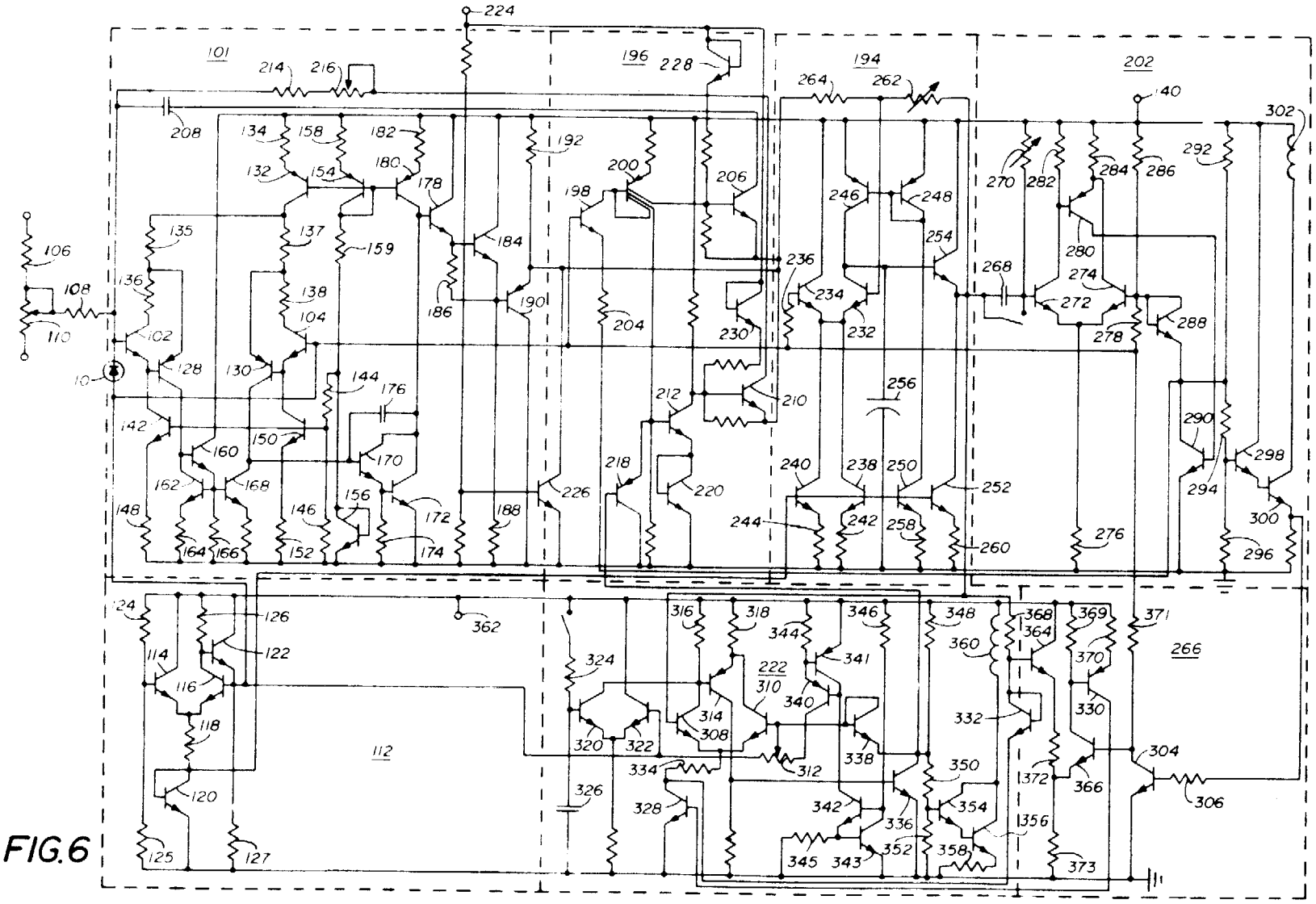
FIG. 6 is a schematic of a bipolar transistorized circuit for a camera aperture and shutter control system.

Referring to FIG. 6, there is shown the complete schematic of a camera and shutter control system including the photosensor 10 coupled to a differential amplifier input stage of super-beta transistors 102 and 104. The cathode electrode of the photosensor 10 also connects to a biasing circuit comprising resistors 106 and 108 and a variable resistor 110. A reference voltage, as established at the output of a reference supply 112, is applied to the anode electrode of the photosensor 10 and the base electrode of the transistor 104.

The reference supply 112 includes a differential amplifier of transistors 114 and 116 having a comomn emitter connection. Emitter current for the transistor pair is established and controlled by a network consisting of a resistor 118 and a transistor 120. The reference voltage generated by the supply 112 appears at the emitter terminal of a transistor 122 having a base electrode connected to the collector electrode of the transistor 116. Resistors 124 through 127 establish the various bias voltage levels and current levels for operation of the transistors of the reference supply 112.

To protect the super-beta transistors from over-voltage surges, a transistor 128 is shunted across the transistor 102 and a transistor 130 shunts the transistor 104. Collector current control for the transistors 102 and 104 is provided by a circuit that includes a transistor 132 and resistors 134 through 138. Transistor 132 is connected to the positive side of a D.C. supply at terminal 140 through the resistor 134. The emitter circuit for the transistor 102 includes a transistor 142 having a base electrode connected to the junction of resistors 144 and 146 and an emitter electrode connected to ground through a resistor 148. Similarly, the super-beta transistor 104 includes a transistor 150 in the emitter electrode circuit with the base electrode of the transistor 150 connected to the junction of resistors 144 and 146 and having an emitter electrode connected to ground through a resistor 152. A voltage developed at the junction of the resistors 144 and 146 is established by transistors 154 and 156 along with resistors 158 and 159 in a circuit connected from the D.C. supply to ground.

The output circuit for the transistor 102 includes transistors 160 and 162 in addition to the transistor 128. The emitter current of the transistor 162 is controlled by a resistor 164, and the emitter current of the transistor 160 and the base drive of the transistor 162 *are* [is] controlled by a resistor 166. This voltage at the emitter electrode of the transistor 160 also drives a transistor 168 in the output circuit for the transistor 104. A voltage at the collector electrode of the transistor 168 is the output of the differential input pair and is applied to cascaded transistors 170 and 172 that are part of a circuit that contains a base drive resistor 174 and a capacitor 176.

Connected to the common collector junction of the transistors 170 and 172 is the base electrode of a transistor 178 and the collector electrode of a transistor 180. Transistor 178 further amplifies the output voltage of the differential input pair. Transistor 180, which has an emitter electrode connected to the positive terminal of a D.C. supply through a resistor 182, establishes the base bias level of the transistor 178. Further amplification of the signal from the differential input pair is provided by the transistor 184 having a base level set by the resistors 186 and 188. The final amplification stage of the amplifier 101 in the system shown includes a transistor 190 having a base electrode coupled to the emitter electrode of the transistor 184. In the emitter circuit of the transistor 190 is a resistor 192 connected to the D.C. supply.

By operation of the super-beta transistors 102 and 104 and the various other amplification stages, the voltage at the emitter electrode of the transistor 190 varies in a predetermined relationship with the light intensity incident on the photosensor 10. This voltage is coupled to the input of an operational amplifier 194 and to one of one of two feedback circuits through an electronic switch 196. Switch 196 includes transistors 198 and 200 for determining the initial state of the switching circuitry. Transistor 198 is coupled to the reference supply 112 through the base electrode and the output of a threshold detector 202 through a resistor 204 to the emitter electrode. Transistor 200 connects to the base electrode of a switching transistor 206 that connects a capacitor 208 in the feedback loop for the amplifier 101 when in a conducting state. Transistor 200 also controls the switching transistor 210 through an inverting transistor 212. Transistor [200] *210* connects resistors 214 and 216 in a feedback loop for the amplifier 101. In addition to the transistor 212, the circuit for controlling the operation of the switching transistor 210 includes transistors 218 and 220. Transistor 218 is controlled by the output of the threshold detector 222 through a base electrode connection.

During a reset cycle of the camera control, a voltage at terminal 224 controls the conducting state of transistors 226, 228 and 230 in the electronic switch 196.

As explained, a voltage at the emitter electrode of the transistor 190 is the input to the amplifier 194. This voltage is applied to the base electrode of a transistor 232 of a differential pair that includes a transistor 234. The output of this differential pair is determined by the difference between the voltage at the base electrode of transistor 232 and the base electrode of transistor 234. A voltage at the base electrode of the transistor 234 is established by the resistor 236 connected to the output of the reference supply 112.

Emitter curent for the transistors 232 and 234 is controlled by transistors 238 and 240, respectively. The base electrode of each of these transistors is connected to the collector electrode of transistor 120 of the reference supply 112. Resistors 242 and 244 connected to the emitter electrodes of the transistors 238 and 240, respectively, complete the current emitter control circuitry for the transistors 232 and 234. Collector current of the transistor 232 is established by a transistor 246 having an emitter electrode connected to the terminal 140 and a base electrode to the base electrode of a transistor 248. Transistor 248 is connected in the collector electrode circuit of a transistor 250 which along with a transistor 252 controls the base curent of the transistor 246.

An output transistor 254 of the amplifier 194 has a base electrode tied to the collector electrode of the transistor 232 and to a filtering capacitor 256. The emitter control circuit for the transistor 254 includes resistor 260.

The output voltage of the amplifier 194 as appearing at the emitter electrode of the transistor 254 is fed back to the base electrode of the transistor 232 through a feedback resistor 262. Resistor 262 along with the input resistor 264 establishes the external gain of the amplifier 194.

The output of the amplifier 194, which corresponds to the output of the amplifier 56 of FIG. 5, connects to the input of the threshold detector 202 and an inhibit circuit 266. The threshold detector 202 corresponds to the detector driver 80 of FIG. 5. An output voltage from the amplifier 194 is coupled through a timing network of a capacitor 268 and a variable resistor 270 to the base electrode of a transistor 272. Transistor 272 is connected in a differential amplifier configuration with a transistor 274. These two transistors have a common emitter junction connected through a resistor 276 to ground. The output of the differentially connected transistors 272 and 274 is the difference between the voltage connected to the base electrode of the transistor 274 and the voltage at the emitter electrode of the transistor 254. This output voltage appears at the collector electrode of a transistor 280 having a base electrode tied to the collector of the transistor 272. Resistors 282 and 284 establish the current levels for the transistors 272 and 280.

A resistor 286 connected to terminal 140 and resistor 278 which is tied to the output of the source 112 establishes the base drive for the transistor 274 and the base drive for the transistor 288. Transistor 288 establishes the collector current for a transistor 290 having a base electrode tied to the collector electrode of the transistor 280. A voltage at the collector of the transistor 290 is applied to the emitter electrode of the transistor 198 of the electronic switch 196 and to a resistor network of resistors 292, 294 and 296.

The voltage at the junction of resistors 294 and 296 drives a transistor 298 in an output stage of the threshold detector 202. Transistor 300 comprises the final output stage of the detector 202 and energizes the aperture solenoid 302 to control the opening of a camera aperture.

Returning to the output of the amplifier 194 as appearing at the emitter electrode of the transistor 254, this voltage is also applied to the base electrode of a transistor 308 in the threshold detector 222. Transistor 308 is part of a differential pair that includes a transistor 310 having a base electrode voltage determined by the setting of a variable resistor 312. An output signal from the differential pair appears at the collector electrode of a transistor 314 having a base electrode connected to the collector electrode of the transistor 308. Resistors 316 and 318 establish the current levels for the transistors 308 and 314.

The threshould detector 222 is similar in many respects to the threshold detector 202. One difference, however, is a "flash control" provision that includes differential transistors 320 and 322. The base electrode of transistor 322 is driven by the output of the reference supply 112. The base electrode of the transistor 320 is coupled to a timing circuit of a resistor 324 and a capacitor 326.

Emitter current for the differential transistors 308 and 310 is controlled by a transistor 328 having a base electrode coupled to the collector electrode of a transistor 330 in the inhibit circuit 266. The collector electrode of the transistor 328 is tied to the emitter electrode of a transistor 332, also in the inhibit circuit 266. Thus, transistor 328 establishes the emitter current for the transistors 308 and 310 through a resistor 334, and, by the interconnection to the inhibit circuit 266, controls the operation of the differential transistors 308 and 310.

When in the inhibit state, the detector 222 is in a hold condition. This continues so long as the aperture solenoid 302 operates to position the camera aperture. After the aperture has been set, as determined by a signal at the base electrode of the transistor 304, the output voltage on the transistor 314 is applied to the base electrode of a transistor 336. A collector bias for the transistor 336 is provided by means of a transistor 338 having a base electrode tied to the wiper arm of the variable resistor 312. The voltage at the variable resistor 312 is established by the output of the reference supply 112 and transistors 340 through 343 and resistors 344 through 346.

A voltage appearing at the collector electrode of the transistor 336 is applied to a network of resistors 348, 350 and 352. At the junction between resistors 350 and 352 there is connected the base electrode of a transistor 354 of the output stage of the threshold detector 222. A transistor 356 is also included in the output stage and has an emitter electrode coupled to ground through a resistor 358. In series with the common connection of the collector electrodes of transistors 354 and 356 is a shutter control solenoid 360 that has one terminal tied to the positive side of a D.C. supply at a terminal 362.

As mentioned, the operation of the threshold detector 222 is inhibited by the inhibit circuit 266. A voltage at the emitter electrode of the transistor 300 drives a transistor 304 through a resistor 306 in the inhibit circuit. In addition to the other transistors previously defined, the circuit 266 further includes transistors 364 and 366 each having a base connection to the collector electrodes of transistors 332 and 304, respectively. The remainder of the inhibit circuit 266 includes resistors 368 through 373. This circuit operates to inhibit the threshold detector 222, as explained with regard to the system of FIG. 5.

The operation of the circuit of FIG. 6 is similar to the system of FIG. 5. The capacitor 268 and resistor 270 determine the operation of the aperture control solenoid 302 in conjunction with the light incident upon the photosensor 10. Upon completion of the aperture setting operation, the feedback capacitor 208 is connected in the feedback loop for the amplifier 101 and the inhibit circuit 266 controls the shutter solenoid 360, leaving the camera shutter open for a time determined by the amount of light incident upon the photosensor 10.

Figure 7:
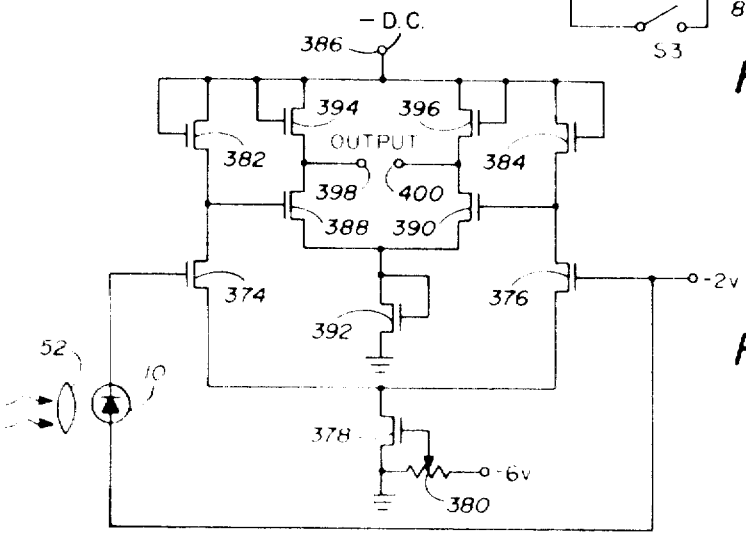
FIG. 7 is a schematic of an MOS circuit producing an output that varies proportionately with the light intensity incident on a photosensor.

In addition to bipolar circuitry, the photosensor 10 may be included in the input stage of a P-channel MOSFET differential amplifier as illustrated in FIG. 7. The photosensor 10, which receives light through the optical filter 52, connects to the [base] *gate* electrode of field-effect transistors 374 and 376. These transistors are coupled in a differential amplifier configuration with a common connection through a transistor 378 for [emitter] *source* current control; the [emitter] *source* current being established by the setting of a variable resistor 380. The [collector] *drain* current for the transistors 374 and 376 is controlled by transistors 382 and 384, respectively, having one electrode coupled to the negative terminal of a D.C. supply at terminal 386. An output signal from the transistor 374 is applied to a transistor 388 which comprises part of a differential pair that includes a transistor 390 coupled to the output of the transistor 376. Transistors 388 and 390 have a common connection to a transistor 392 that controls the current flow through these transistors. Additional circuitry for the transistors 388 and 390 includes transistors 394 and 396.

An outuput voltage from the circuit of FIG. 7 appears at the terminals 398 and 400 and is related to the light intensity incident upon the photosensor 10. The differential amplifier configuration of FIG. 7 is included in a MOS shutter control circuit in a manner similar to that described above with respect to the bipolar circuit of FIG. 1.

While several embodiments of the invention, together with modifications thereof, have been described in detail herein and shown in the accompanying drawings, it will be evident that various further modifications are possible without departing from the scope of the invention.

What is claimed is:

1. In a camera shutter and aperture control system, the combination comprising:

a light-responsive photosensor generating a current signal that varies with light intensity incident thereon, an amplifier including a differential input section connected to said light-responsive photosensor and having a first feedback loop for relating the amplifier output proportionately to the diode-generated signal and a second feedback loop for relating the amplifier output to the time integral of the photosensor generated signal, switching means for connecting each of the feedback loops separately to said amplifier output, a second amplifier having an output that varies with [film speed and] the output of said first amplifier, a first threshold detector responsive to the output of said second amplifier when said switching means connects the first feedback loop across said first amplifier for controlling the camera aperture setting, a second threshold detector responsive to the output of said second amplifier when said switching means connects the second feedback loop across said first amplifier for controlling the camera shutter operation, and means for inhibiting the operation of said second threshold detector until said first threshold detector sets the opening of the camera aperture.

2. In a camera shutter and aperture control system as set forth in claim 1 including timing means connected between the output of said second amplifier and said first threshold detector for controlling the operation of said first detector in accordance with the output of the second amplifier.

3. In a camera shutter and aperture control system as set forth in claim 2 including means for biasing the second input to the differential section of the first amplifier and one side of said light-responsive photosensor at a reference level.

4. In a camera shutter and aperture control system as set forth in claim 3 wherein said light-responsive photosensor is a selenium photovoltaic cell.

5. In a camera shutter and aperture control system as set forth in claim 3 wherein said light-responsive photosensor is a silicon transistor.

6. In a camera shutter and aperture control system as set forth in claim 5 including means for shunting the collector-base junction of said transistor.

7. In a camera shutter and aperture control system as set forth in claim 6 including means for biasing the emitter-base junction of said transistor.

8. In a camera shutter and aperture control system as set forth in claim 7 including an optical filter to limit the response of said transistor to radiant energy in the visible region.

References Cited

The following references, cited by the Examiner, are of record in the patented file of this patent or the original patent.

UNITED STATES PATENTS

| | | | |
|---|---|---|---|
| 3,349,678 | 10/1967 | Sukuki et al. | 95—10 C |
| 3,430,106 | 2/1969 | McDowell | 250—214 X |
| 3,450,015 | 6/1969 | Reimann et al. | 95—10 C |
| 3,460,450 | 8/1969 | Ogihara | 95—10 C |
| 3,464,332 | 9/1969 | Davison et al. | 95—10 C |

JAMES W. LAWRENCE, Primary Examiner

U.S. Cl. X.R.

250—211 J, 214 P; 307—311, 330, 126